(12) United States Patent
Seo et al.

(10) Patent No.: US 11,527,848 B2
(45) Date of Patent: Dec. 13, 2022

(54) GROMMET AND APPARATUS FOR ALIGNING WIRE

(71) Applicant: HYUNDAI MOBIS CO., LTD., Seoul (KR)

(72) Inventors: Yeong Woo Seo, Yongin-si (KR); Yul Kyu Son, Yongin-si (KR); Hye Seong Yang, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 63 days.

(21) Appl. No.: 17/135,180

(22) Filed: Dec. 28, 2020

(65) Prior Publication Data

US 2021/0210898 A1    Jul. 8, 2021

(30) Foreign Application Priority Data

Jan. 8, 2020    (KR) .................. 10-2020-0002610

(51) Int. Cl.
*H01R 13/52* (2006.01)
*B60R 16/02* (2006.01)
*H01R 13/73* (2006.01)

(52) U.S. Cl.
CPC ..... *H01R 13/5208* (2013.01); *B60R 16/0222* (2013.01); *H01R 13/73* (2013.01)

(58) Field of Classification Search
None
See application file for complete search history.

(56) References Cited

U.S. PATENT DOCUMENTS

| 6,419,368 B1 * | 7/2002 | Guttenberger ..... H01R 13/5816 359/872 |
| 6,660,937 B1 * | 12/2003 | MacLeod ................. H02G 3/22 174/152 G |

FOREIGN PATENT DOCUMENTS

| KR | 10-2007-0120219 A | 12/2007 |
| KR | 10-2013-0107842 A | 10/2013 |

* cited by examiner

*Primary Examiner* — Ross N Gushi
(74) *Attorney, Agent, or Firm* — NSIP Law

(57) ABSTRACT

A grommet includes a body, which has a block shape with a wire passing hole formed by perforation, and a guide, which extends from one end of the body at a predetermined angle and has a guide hole formed by perforation.

15 Claims, 16 Drawing Sheets

GROMMET AND APPARATUS FOR ALIGNING WIRE

CROSS-REFERENCE TO RELATED APPLICATION(S)

This application claims priority from and the benefit of Korean Patent Application No. 10-2020-0002610, filed on Jan. 8, 2020, which is hereby incorporated by reference for all purposes as if set forth herein.

TECHNICAL FIELD

Exemplary embodiments relate to a grommet and an apparatus for aligning a wire and, more particularly, to a grommet and an apparatus for aligning a wire which, while aligning a wire, are capable of preventing the wire from being moved upward and damaged even though the wire is formed to be long.

BACKGROUND

Various electrical components have been installed and used in automobiles or many other mechanical devices, and these electrical components are electrically connected by wires.

Wires are required to be installed by passing through panels, doors, or the like inside automobiles or other mechanical devices, and thus, the panels or doors may have through-holes through which wires pass. Grommets for aligning and protecting wires and ensuring a seal may be installed in the through-holes.

Also, various types of grommets are installed in the inside of the automobiles in which a wire harness having a bundle of a plurality of wires, cables, or the like is installed, and these grommets may not only allow the plurality of wires or the wire harness to be stably installed and prevent damage thereto and so on.

A grommet may have therein wire passing holes through which one or more wires, a wire harness, or the like pass. Also, a mounting portion is provided on an outer surface of the grommet and separably coupled to a through-hole of a panel, a door, or the like, and thus, the grommet may be firmly mounted to the through-hole of the panel, the door, or the like.

A grommet may be made of a rubber material and so on, and may thus prevent noise, vibration, and harshness and provide water- and air-tightness.

As described above, a wiring process may be completed by making one or more wires, a wire harness, or the like pass through wire passing holes of a grommet and then mounting a mounting portion of the grommet to a through-hole of a door, panel, or the like.

FIG. 1 is a perspective view showing a state in which a temperature sensor wire 21 passes through a first grommet 11a of the related art, and FIG. 2 is a perspective view showing a state in which a resolver wire 22 passes through a second grommet 12a of the related art.

As illustrated in FIG. 1 and FIG. 2, installation of the grommets 11a and 12a according to the related art may be completed by making the wires 21 and 22, a wire harness, or the like pass through wire passing holes. Here, only the wire passing holes are in contact with the wires 21 and 22 to create a friction force directly on the outer surfaces of the wires 21 and 22, but the wire passing holes do not apply high pressure to the wire 21 and 22. Thus, the friction force applied between the wires 21 and 22 and the wire passing holes is small, and thus, the wires 21 and 22 freely move even after passing through the wire passing holes.

FIG. 3 is a plan view showing a state in which the first grommet 11a and the second grommet 12a according to the related art are assembled to a transmission housing 31, and FIG. 4 is a perspective view showing a state in which a motor stator 32 is assembled to the transmission housing 31 to which the first grommet 11a and the second grommet 12a according to the related art are assembled.

Here, when a motor and a transmission are assembled, relatively small parts of a rotor (not shown) of the motor are inserted into the transmission housing 31, and relatively large remaining parts of a stator 32 of the motor face and come into contact with the outer surface of the transmission housing 31. Also, a temperature sensor for measuring a temperature of the motor and a resolver for measuring a rotation speed of the motor and a rotation position are installed in the rotor of the motor. The temperature sensor and the resolver include the wires 21 and 22 for transmitting the measured values to an external controller. The temperature sensor and the resolver are inserted into the transmission housing 31 because the temperature sensor and the resolver have to be installed in the vicinity of the rotor of the motor in order to accurately measure the values, but the controller is positioned outside. Thus, the grommets 11a and 12a are mounted to a boundary region between the motor and the transmission housing 31, and the wires 21 and 22 may connect the inside and outside of the transmission housing 31 as the wires 21 and 22 pass through the wire passing holes of the grommets 11a and 12a.

However, in general, in order to ensure the convenience of work when the temperature sensor and the resolver are installed, each of the wires 21 and 22 for the temperature sensor and the resolver is formed to have a length greater than an appropriate length and is then installed. However, in a case where the wires 21 and 22 are excessively long, the wires 21 and 22 after the installation has been completed may be moved upward and inserted into the transmission housing 31 or come into contact with the boundary region between the motor and the transmission, due to the small friction force between the wires 21 and 22 and the wire passing holes as described above. Accordingly, the wire 21 and 22 are damaged and disconnected, and thus, the measured values may not be accurately transmitted to the controller.

RELATED ART DOCUMENT

Patent Documents (Patent Document 1) Korean Patent Publication No. 2013-0107842

(Patent Document 2) Korean Patent Publication No. 2007-0120219

SUMMARY

Exemplary embodiments of the present disclosure provide a grommet and an apparatus for aligning a wire which, while aligning a wire, are capable of preventing the wire from being moved upward and damaged even though the wire is formed to be long.

The objects of the present disclosure are not limited to the aforesaid, but other objects not described herein will be clearly understood by those skilled in the art from descriptions below.

A first exemplary embodiment of the present disclosure provides a grommet including: a body which has a block shape with a wire passing hole formed by perforation; and a guide which extends from one end of the body at a predetermined angle and has a guide hole formed by perforation.

Also, the guide may extend perpendicularly from the body.

Also, the guide may be formed integrally with the body.

Also, the wire passing hole may be a circular through-hole and formed in plurality.

Also, the one guide hole may have a size greater than a sum of sizes of the plurality of wire passing holes.

Also, the guide hole may be a rectangular through-hole.

Also, the guide hole may have chamfered or filleted corners.

Also, the guide hole may be elongated in a width direction of the guide.

Also, the grommet may further include a protrusion which protrudes outward from an outer wall of the body.

A second exemplary embodiment of the present disclosure provides an apparatus for aligning a wire, the apparatus including: a plurality of grommets, each including a body, which has a block shape with a wire passing hole formed by perforation, and a guide, which extends from one end of the body at a predetermined angle and has a guide hole formed by perforation; and a grommet fixing unit configured to connect and fix the guides of the plurality of grommets to each other.

Also, the grommet fixing unit may include: a fixing hook which has a cylindrical annular shape with one side open and whose both ends respectively inserted into the guide holes of the plurality of grommets; a wire retainer configured to cover, from above, the wire that simultaneously pass through the wire passing holes and the guide holes; and a connection portion configured to connect the fixing hook to the wire retainer.

Also, the connection portion may be bent.

Also, the fixing hook and the wire retainer may be disposed perpendicular to each other.

Also, the fixing hook may have a diameter greater than a sum of thicknesses of outer walls of the plurality of guide holes.

Also, the guide may extend perpendicularly from the body.

Other specific features of the present disclosure are included in the detailed description and drawings.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION

Figure 1:
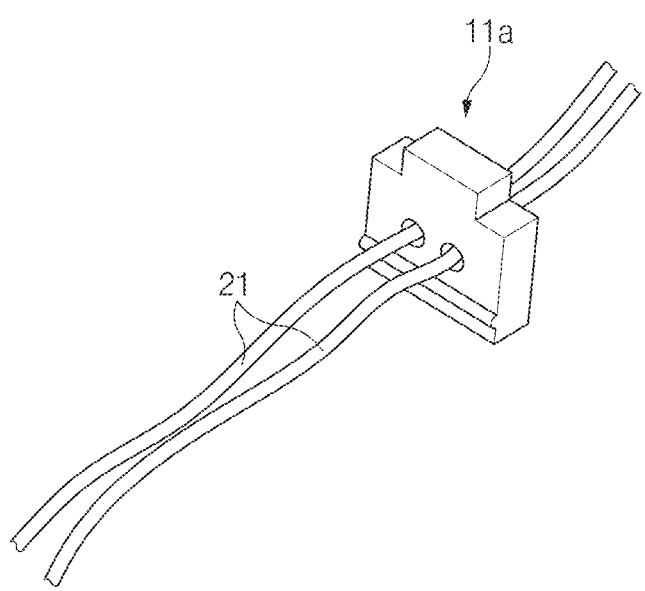
FIG. 1 is a perspective view showing a state in which a temperature sensor wire passes through a first grommet of the related art.
Figure 2:
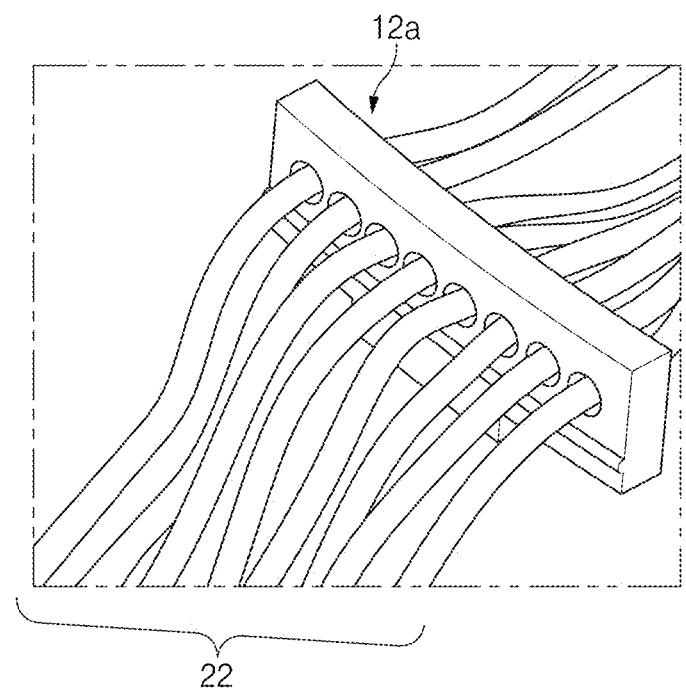
FIG. 2 is a perspective view showing a state in which a resolver wire passes through a second grommet of the related art.
Figure 3:
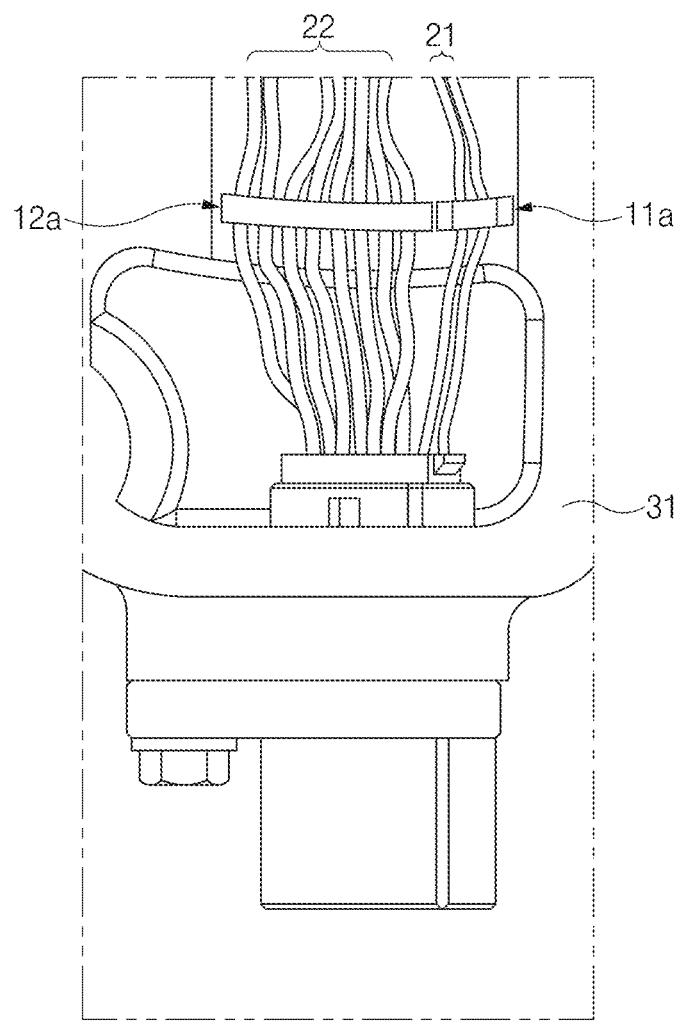
FIG. 3 is a plan view showing a state in which the first grommet and the second grommet according to the related art are assembled to a transmission housing.
Figure 4:
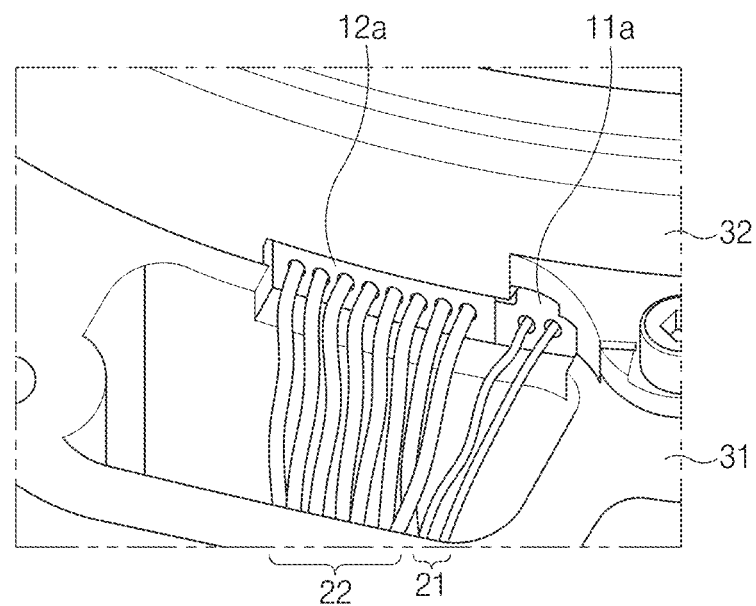
FIG. 4 is a perspective view showing a state in which a motor stator is assembled to the transmission housing to which the first grommet and the second grommet according to the related art are assembled.

Advantages and features of the present disclosure, and implementation methods thereof will be clarified through following exemplary embodiments described in detail with reference to the accompanying drawings. The present disclosure may, however, be embodied in various different forms and should not be construed as limited to the exemplary embodiments set forth herein. Rather, these exemplary embodiments are provided so that this disclosure will be thorough and complete, and will fully convey the scope of the present disclosure to those skilled in the art. Further, the present disclosure is defined only by scopes of claims. Like reference numerals refer to like elements throughout.

Unless otherwise defined, all terms (including technical and scientific terms) used herein have the same meaning as commonly understood by one of ordinary skill in the art to which the present disclosure belongs. Also, terms as defined in a generally used dictionary are not construed ideally or excessively unless defined apparently and specifically.

In this specification, the terms are used only for explaining exemplary embodiments while not limiting the present disclosure. In this specification, the singular forms include the plural forms as well, unless the context clearly indicates otherwise. The meaning of "comprises" and/or "comprising" used in the specification does not exclude the presence or addition of one or more components other than the mentioned component(s).

Hereinafter, preferred exemplary embodiments of the present disclosure will be described in detail with reference to the accompanying drawings.

Figure 5:
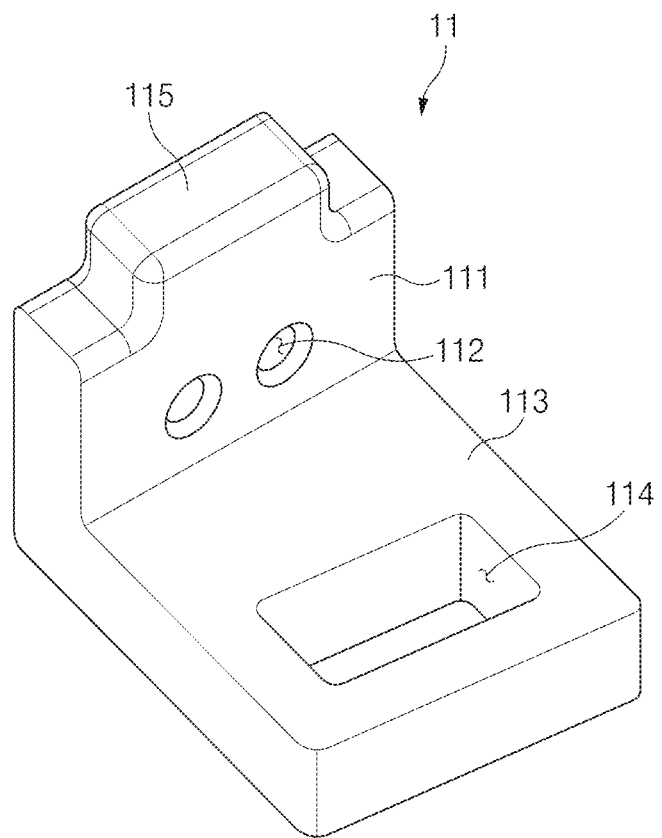
FIG. 5 is a front perspective view of a first grommet according to an exemplary embodiment of the present disclosure.
Figure 6:
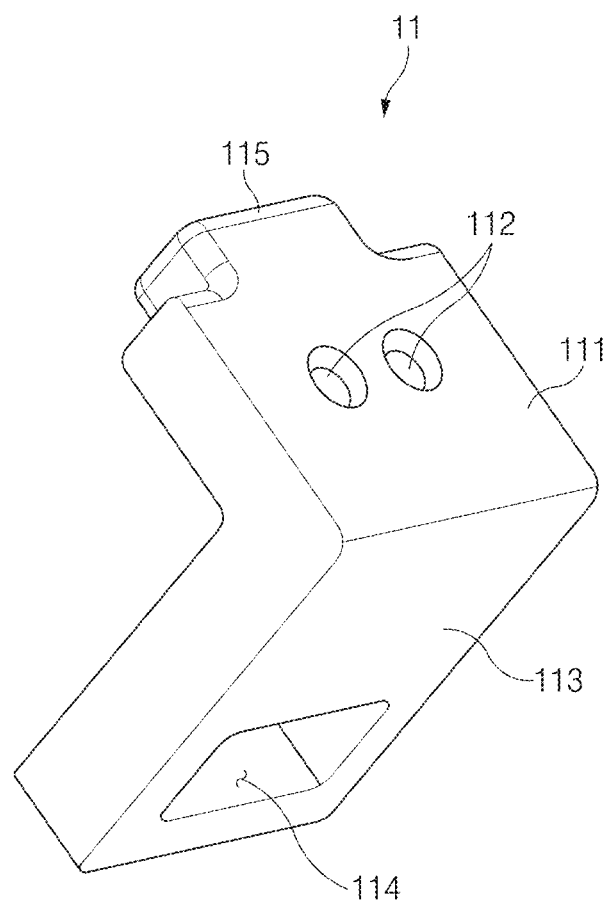
FIG. 6 is a rear perspective view of the first grommet according to an exemplary embodiment of the present disclosure.
Figure 7:
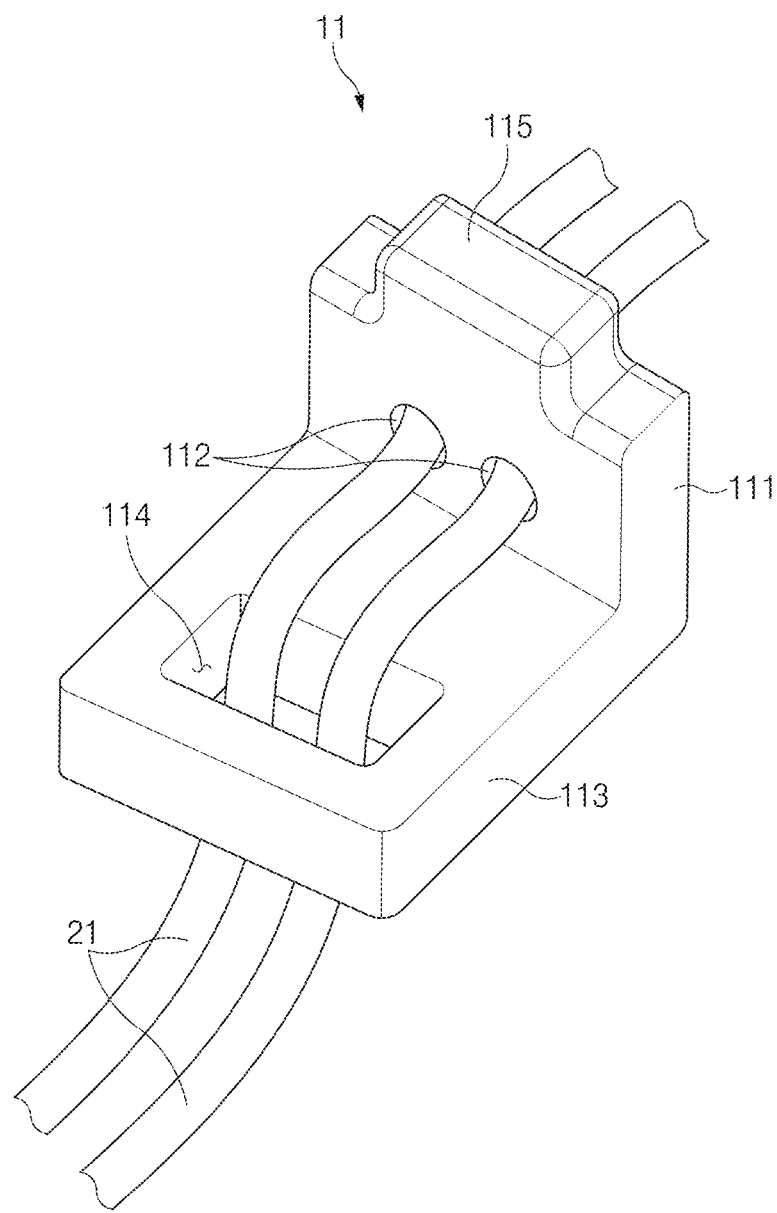
FIG. 7 is an operation view illustrating a state in which temperature sensor wires pass through wire passing holes of the first grommet according to an exemplary embodiment of the present disclosure.

FIG. 5 is a front perspective view of a first grommet 11 according to an exemplary embodiment of the present disclosure, FIG. 6 is a rear perspective view of the first grommet 11 according to an exemplary embodiment of the present disclosure, and FIG. 7 is an operation view illustrating a state in which temperature sensor wires 21 pass through wire passing holes 112 of the first grommet 11 according to an exemplary embodiment of the present disclosure.

According to an exemplary embodiment of the present disclosure, not only wire passing holes 112 and 122 but also guide holes 114 and 124 are formed in grommet 11 and 12 to increase a friction force applied to wires 21 and 22, and thus, although the wires 21 and 22 are formed to be long, damage to the wires 21 and 22 may be prevented by not allowing the wires 21 and 22 to be moved upward and inserted into a transmission housing 31 or come into contact with a boundary region between a motor and a transmission.

For this, the grommets 11 and 12 according to an exemplary embodiment of the present disclosure may include: bodies 111 and 121 which have a block shape with wire passing hole 112 and 122 formed by perforation; and guides 113 and 123 which extend from respective ends of the bodies 111 and 121 at a predetermined angle and have guide holes 114 and 124 formed by perforation.

The body 111 may have a block shape. The block shape generally has a polyhedral shape, and particularly, it is desirable that the body 111 of the first grommet 11 has a hexahedral shape as illustrated in FIG. 5 and FIG. 6.

The wire passing holes 112 may be formed by perforating the body 111. As described above, the wires 21 and 22 pass through the wire passing holes 112 and 122, and in the first grommet 11 as illustrated in FIG. 7, temperature sensor wires 21 pass through the wire passing holes 112. In general, each of the temperature sensor wires 21 has a circular cross-section, and thus, each of the wire passing holes 112 may also be a through-hole having a circular cross-section. Also, it is desirable that the wire passing hole 112 is large enough to allow the temperature sensor wire 21 to be easily inserted but is small enough to constrain the temperature sensor wire 21 so that the temperature sensor wire 21 is not allowed to move a lot laterally in the wire passing hole 112. For example, it is desirable that the diameter of the wire passing hole 112 is equal to or less than two times the diameter of the cross-section of the temperature sensor wire 21.

In general, the temperature sensor wires 21 may include two types of wires 21 such as an input and an output. Thus, two wire passing holes 112 are formed in the first grommet 11, and one wire 21 may pass through one wire passing hole 112.

The guide 113 extends from one end of the body 111 at a predetermined angle. For example, as illustrated in FIG. 5 and FIG. 6, the guide 113 may extend from a lower end of the body 111, and the predetermined angle may be a right angle. Thus, the guide 113 may extend perpendicularly from the body 111.

The guide 113 may be manufactured separately from the body 111 and then assembled thereto, but may be formed integrally with the body 111. Thus, the guide 113 is not easily separated from the body 111, and thus, the durability may be further improved.

The guide hole 114 may be formed by perforating the guide 113, and the guide hole 114 may be a rectangular through-hole. Also, the guide hole 114 may have chamfered or filleted corners. The wires 21 also pass through the guide hole 114, and in the first grommet 11 as illustrated in FIG. 7, the temperature sensor wires 21 pass through the guide hole 114. In the wire passing holes 112, one temperature sensor wire 21 passes through one wire passing hole 112, but in the guide hole 114, all of a plurality of temperature sensor wires 21 may pass through one guide hole 114. For this, it is desirable that the guide hole 114 is formed to be large. For example, it is desirable that the one guide hole 114 has a size greater than a sum of sizes of the plurality of wire passing holes 112.

Here, the first grommet 11 may further include a protrusion 115 that protrudes outward from an upper outer wall of the body 111. The protrusion 115 is inserted into a groove formed in the motor when the first grommet 11 is mounted to the boundary region between the motor and the transmission housing 31, and thus, after being mounted, the first grommet 11 may be prevented from being moved or separated outward.

Figure 8:
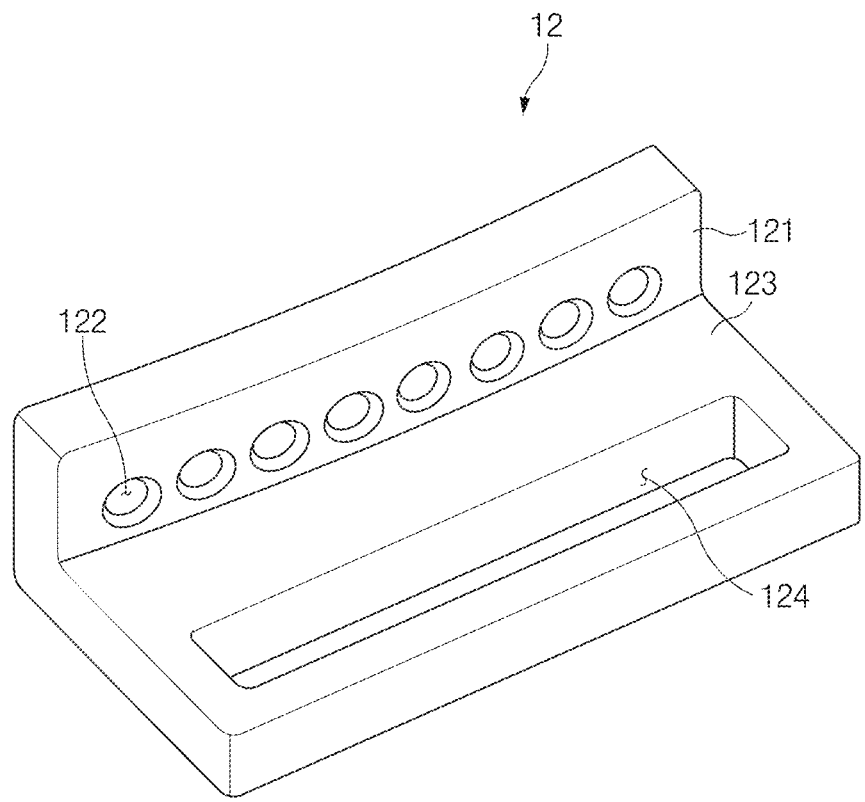
FIG. 8 is a front perspective view of a second grommet according to an exemplary embodiment of the present disclosure.
Figure 9:
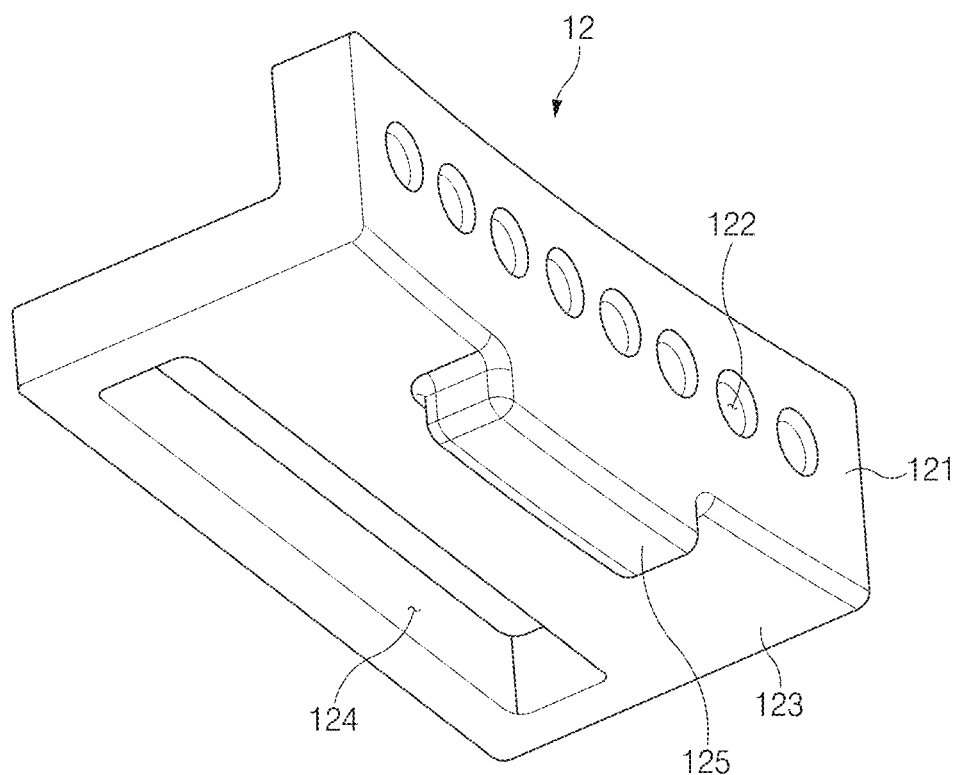
FIG. 9 is a rear perspective view of the second grommet according to an exemplary embodiment of the present disclosure.
Figure 10:
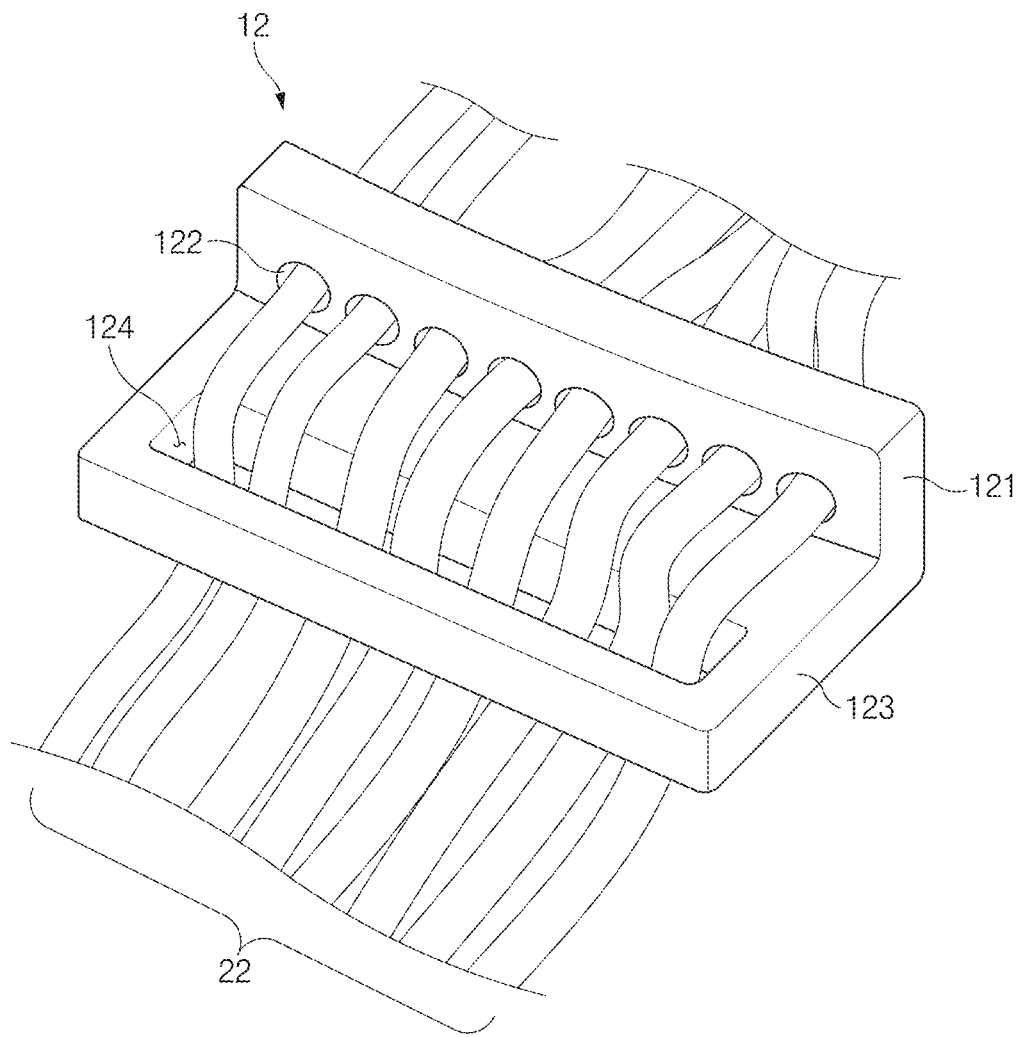
FIG. 10 is an operation view illustrating a state in which resolver wires pass through wire passing holes of the second grommet according to an exemplary embodiment of the present disclosure.

FIG. 8 is a front perspective view of a second grommet 12 according to an exemplary embodiment of the present disclosure, FIG. 9 is a rear perspective view of the second grommet 12 according to an exemplary embodiment of the present disclosure, and FIG. 10 is an operation view illustrating a state in which resolver wires 22 pass through wire passing holes 122 of the second grommet 12 according to an exemplary embodiment of the present disclosure.

It is also desirable that the body 121 of the second grommet 12 has a hexahedral shape as illustrated in FIG. 8 and FIG. 9.

In the second grommet 12 illustrated in FIG. 10, the resolver wires 22 pass through the wire passing holes 122. In general, each of the resolver wires 22 also has a circular cross-section, and thus, each of the wire passing holes 122 may also be a through-hole having a circular cross-section. Also, it is desirable that the wire passing hole 122 is large enough to allow the resolver wire 22 to be easily inserted but is small enough to constrain the resolver wire 22 so that the resolver wire 22 is not allowed to move a lot laterally in the wire passing hole 122. For example, it is desirable that the diameter of the wire passing hole 122 is equal to or less than two times the diameter of the cross-section of the resolver wire 22.

In general, like the motor, the resolver includes a rotor and a stator. The rotor of the resolver is connected to the rotor of the motor, and when the rotor of the motor rotates, the rotor of the resolver also rotates inside the stator of the resolver. Also, a plurality of coils are wound around the rotor of the resolver, and the rotation speed of the rotor of the motor and the rotation position may be measured through a sinusoidal output which is outputted from each of the plurality of coils. Thus, the resolver wire 22 may include many wires 22 so that the output is outputted from each of the plurality of coils, and for example, may include eight wires 22 as illustrated in FIG. 10. Thus, eight wire passing holes 122 are formed in the second grommet 12, and one wire 22 may pass through one wire passing hole 122.

The guide holes 114 and 124 may be formed by perforating the guides 113 and 123. The wires 21 and 22 also pass through the guide holes 114 and 124, and in the second grommet 12 as illustrated in FIG. 10, the resolver wires 22 pass through the guide hole 124. In the wire passing holes 122, one resolver wire 22 passes through one wire passing hole 122, but in the guide hole 124, all of a plurality of resolver wires 22 may pass through one guide hole 124. For this, it is desirable that the guide hole 124 is formed to be large. For example, it is desirable that the one guide hole 124 has a size greater than a sum of sizes of the plurality of wire passing holes 122.

Here, the second grommet 12 may further include a protrusion 125 that protrudes outward from a lower outer wall of the body 121. The protrusion 125 is inserted into a groove formed in the motor when the second grommet 12 is mounted to the boundary region between the motor and the transmission housing 31, and thus, after being mounted, the second grommet 12 may be prevented from being moved or separated outward.

Figure 11:
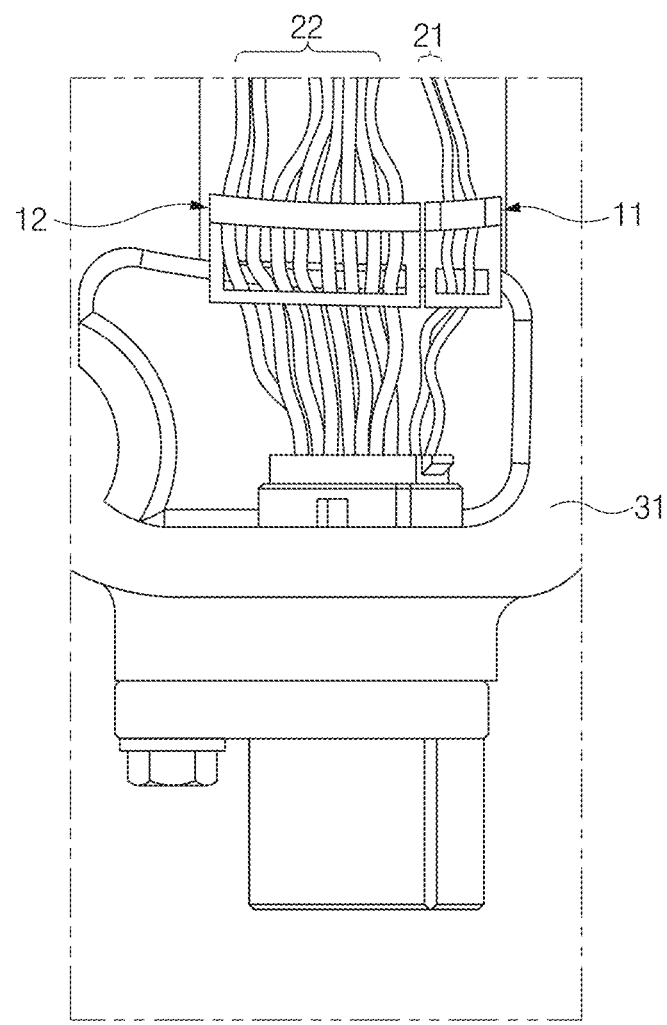
FIG. 11 is a plan view showing a state in which the first grommet and the second grommet according to an exemplary embodiment of the present disclosure are assembled to the transmission housing.
Figure 12:
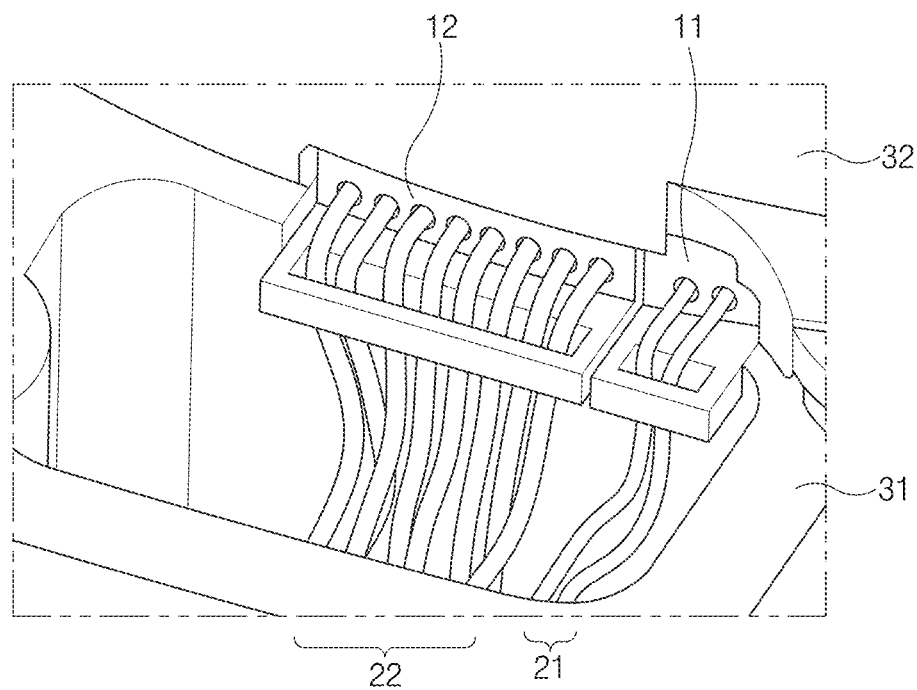
FIG. 12 is a perspective view showing a state in which the motor stator is assembled to the transmission housing to which the first grommet and the second grommet according to an exemplary embodiment of the present disclosure are assembled.

FIG. 11 is a plan view showing a state in which the first grommet 11 and the second grommet 12 according to an exemplary embodiment of the present disclosure are assembled to the transmission housing 31, and FIG. 12 is a perspective view showing a state in which the motor stator 32 is assembled to the transmission housing 31 to which the first grommet 11 and the second grommet 12 according to an exemplary embodiment of the present disclosure are assembled.

As described above, the temperature sensor and the resolver are inserted into the transmission housing 31, but a controller is positioned outside. Thus, as illustrated in FIG. 11, the grommets 11 and 12 are mounted to a boundary region between the motor and the transmission housing 31, and the wires 21 and 22 may connect the inside and outside of the transmission housing 31 as the wires 21 and 22 pass through the wire passing holes 112 and 122 of the grommets 11 and 12.

Here, according to an exemplary embodiment of the present disclosure, not only the bodies 111 and 121 but also the guides 113 and 123 are formed in the grommets 11 and 12. Thus, as illustrated in FIG. 11 and FIG. 12, the temperature sensor wires 21 pass through the wire passing holes 112 of the first grommet 11 and then also pass through the guide hole 114 together. Also, the resolver wires 22 pass through the wire passing holes 122 of the second grommet 12 and then also pass through the guide hole 124 together. In particular, as described above, the guides 113 and 123 extend perpendicularly from the respective ends of the bodies 111 and 121, and thus, the wire passing holes 112 and 122 may be perpendicular to the guide holes 114 and 124. Thus, the friction force is applied to the wires 21 and 22 by the guide holes 114 and 124 as well as the wire passing holes 112 and 122, and thus, the friction force applied to the wires 21 and 22 increases. Thus, although the wires 21 and 22 are formed to be long, damage to the wires 21 and 22 or disconnection thereof may be prevented by not allowing the wires 21 and 22 to be moved upward and inserted into a transmission housing 31 or come into contact with the boundary region between the motor and the transmission.

Figure 13:
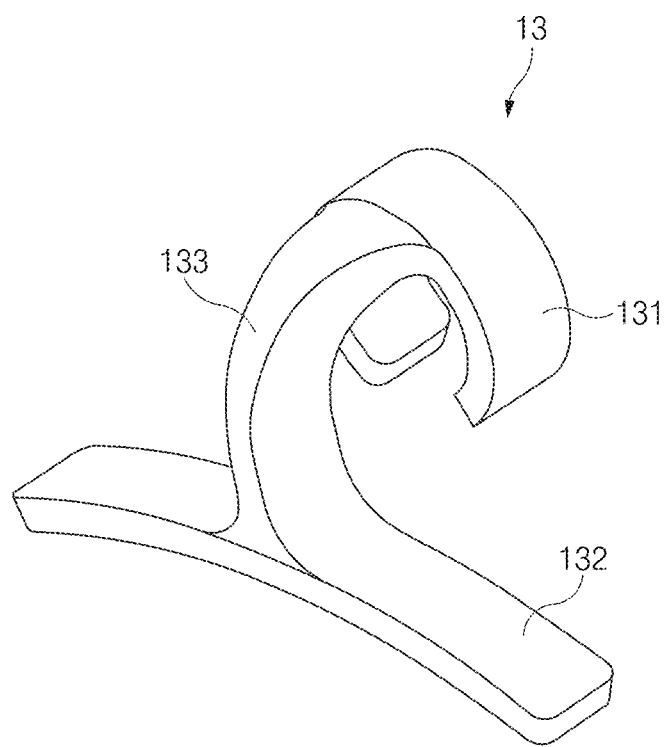
FIG. 13 is a front perspective view of a grommet fixing unit according to another exemplary embodiment of the present disclosure.
Figure 14:
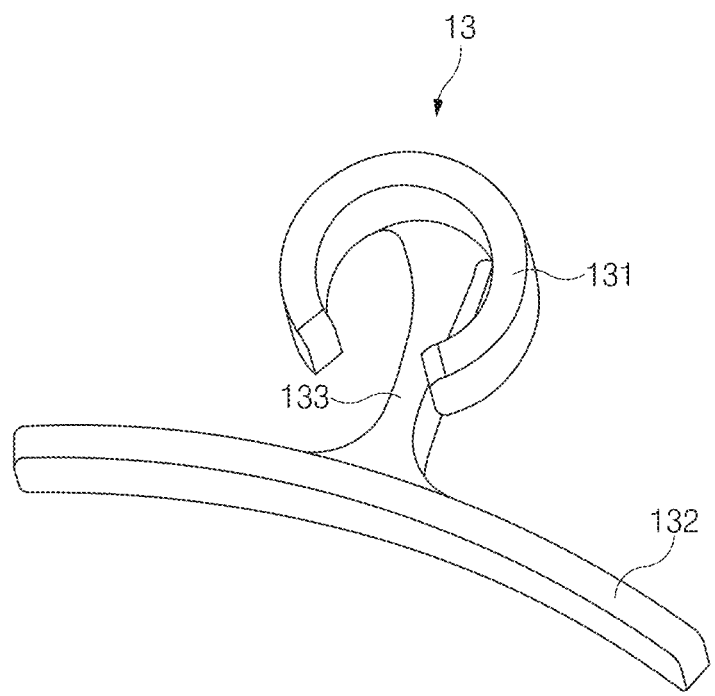
FIG. 14 is a rear perspective view of the grommet fixing unit according to another exemplary embodiment of the present disclosure.

FIG. 13 is a front perspective view of a grommet fixing unit 13 according to another exemplary embodiment of the present disclosure, and FIG. 14 is a rear perspective view of the grommet fixing unit 13 according to another exemplary embodiment of the present disclosure.

According to another exemplary embodiment of the present disclosure, in a case where a plurality of grommets 11 and 12 are installed, both ends of a fixing hook 131 of the grommet fixing unit 13 are respectively inserted into the guide holes 114 and 124 of the plurality of grommets 11 and 12, and thus, the plurality of grommets 11 and 12 may be fixed.

For this, an apparatus for aligning a wire according to another exemplary embodiment of the present disclosure includes: a plurality of grommets 11 and 12 including bodies 111 and 121, which have a block shape with wire passing holes 112 and 122 formed by perforation, and guides 113 and 123, which extend from respective ends of the bodes 111 and 121 at a predetermined angle and have guide holes 114 and 124 formed by perforation; and a grommet fixing unit 13 which connects and fixes the guides 113 and 123 of the plurality of grommets 11 and 12 to each other.

As illustrated in FIG. 13 and FIG. 14, the grommet fixing unit 13 includes: a fixing hook 131 which has a cylindrical annular shape with one side open and whose both ends respectively inserted into the guide holes 114 and 124 of the plurality of grommets 11 and 12; a wire retainer 132 which covers, from above, wires 21 and 22 that simultaneously pass through the wire passing holes 112 and 122 and the guide holes 114 and 124; and a connection portion 133 which connects the fixing hook 131 to the wire retainer 132.

Figure 15:
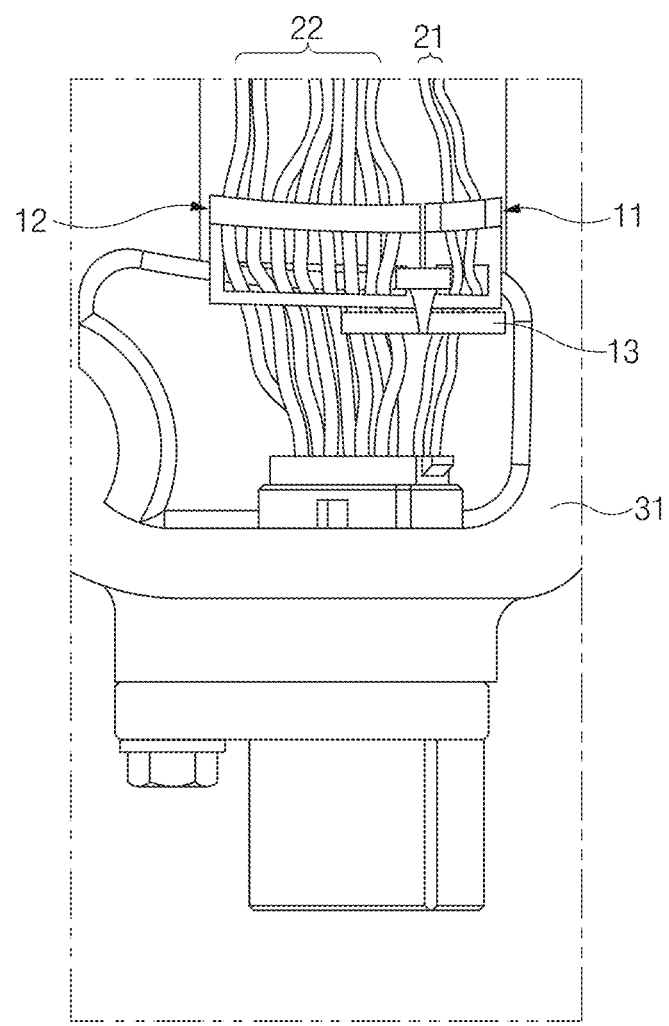
FIG. 15 is a plan view showing a state in which the grommet fixing unit according to another exemplary embodiment of the present disclosure fixes the first grommet to the second grommet.
Figure 16:
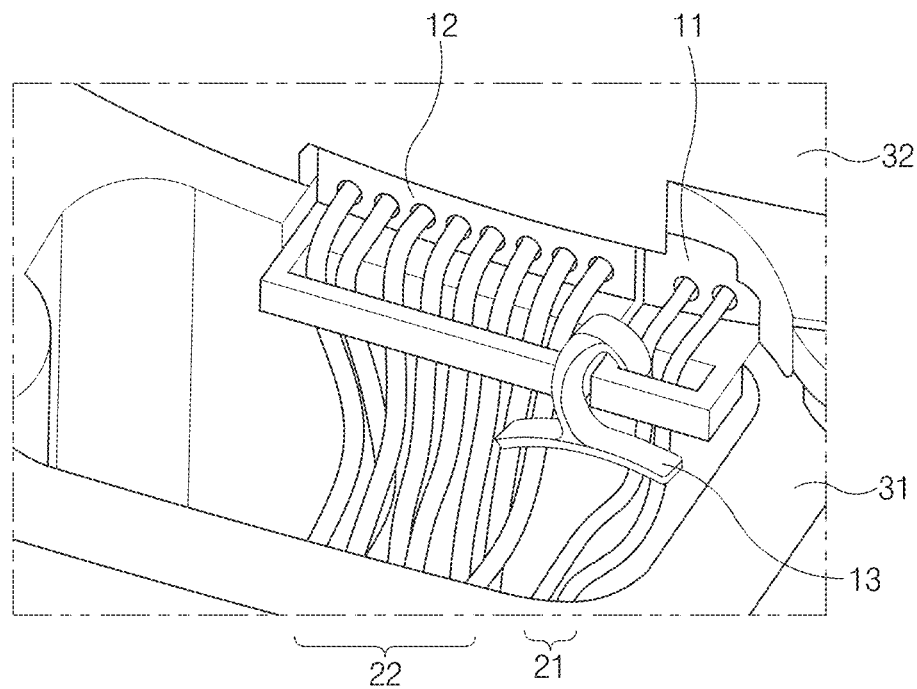
FIG. 16 is a perspective view showing a state in which a motor stator is assembled to a transmission housing to which the first grommet and the second grommet fixed by the grommet fixing unit according to another exemplary embodiment of the present disclosure are assembled.

FIG. 15 is a plan view showing a state in which the grommet fixing unit 13 according to another exemplary embodiment of the present disclosure fixes the first grommet 11 to the second grommet 12, and FIG. 16 is a perspective view showing a state in which a motor stator 32 is assembled to a transmission housing 31 to which the first grommet 11 and the second grommet 12 fixed by the grommet fixing unit 13 according to another exemplary embodiment of the present disclosure are assembled.

The fixing hook 131 has the cylindrical annular shape with one side open. Thus, as illustrated in FIG. 13 and FIG. 14, both ends thereof may face each other in the open one side. Also, when the first grommet 11 and the second grommet 12 are disposed side by side, both the ends of the fixing hook 131 are respectively inserted into the guide holes 114 and 124 formed in the first grommet 11 and the second grommet 12 as illustrated in FIG. 15 and FIG. 16, and thus the grommet fixing unit 13 may be mounted to the plurality of grommets 11 and 12. Accordingly, the first grommet 11 and the second grommet 12 may be fixed to each other.

The fixing hook 131 has a diameter greater than a sum of thicknesses of outer walls of the plurality of guide holes 114 and 124 so that both the ends of the fixing hook 131 are easily inserted into the respective guide holes 114 and 124 of the first grommet 11 and the second grommet 12 disposed side by side. Here, it is desirable that the outer walls of the guide holes 114 and 124 represent a left outer wall and a right outer wall. If the thicknesses of the outer walls of the guide holes 114 and 124 increase, the diameter of the fixing hook 131 also further increases. Accordingly, the entire volume of the grommet fixing unit 13 increases, and thus, assembling other components to the transmission housing 31 may be hindered. Thus, it is desirable that the outer walls of the guide holes 114 and 124 may be thin to some extent.

As described above, each of the guide holes 114 and 124 may be a rectangular through-hole. Also, it is desirable that this rectangular shape is elongated in a width direction of the guides 113 and 123. Accordingly, the thicknesses of the left outer wall and the right outer wall constituting the guide holes 114 and 124 are reduced to some extent, and thus, the diameter of the fixing hook 131 may also be reduced.

It is desirable that the grommet fixing unit 13 is made of an elastic material. Thus, when both the ends of the fixing hook 131 are respectively inserted into the plurality of guide holes 114 and 124, the distance between both the ends of the fixing hook 131 increases to some extent. Also, after both the ends thereof are inserted into the plurality of the guide holes 114 and 124, the distance between both the ends of the fixing hook 131 may decrease again. Accordingly, the grommet fixing unit 13 may be prevented from being separated from the grommets 11 and 12 after being mounted to the grommets 11 and 12.

As illustrated in FIG. 15 and FIG. 16, the wire retainer 132 may cover, from above, the temperature sensor wires 21 and the resolver wires 22 which simultaneously pass through the wire passing holes 112 and 122 and the guide holes 114 and 124 and extend downwards. Accordingly, the wires 21 and 22 may be protected from an external impact.

It is desirable that, when the fixing hook 131 of the grommet fixing unit 13 is mounted to the grommets 11 and 12, a flat top surface thereof faces the bodies 111 and 121 of the grommets 11 and 12. The guide holes 114 and 124 are oriented downward, and both the open ends of the fixing hook 131 are also oriented downward, because the guides 113 and 123 having the guide holes 114 and 124 are perpendicular to the bodies 111 and 121, and the flat top surface of the fixing hook 131 is perpendicular to both the open ends.

On the other hand, because the wire retainer 132 of the grommet fixing unit 13 covers the wires 21 and 22 from above, a bottom surface thereof may be oriented downward.

Thus, the fixing hook 131 of the grommet fixing unit 13 may be disposed perpendicular to the wire retainer 132 as illustrated in FIG. 15 and FIG. 16. In order to connect the fixing hook 131 and the wire retainer 132 disposed perpendicular to each other, the connection portion 133 may be bent at a right angle as illustrated in FIG. 13 and FIG. 14. However, the exemplary embodiment is not limited thereto, and the connection portion 133 may have various shapes, for example, be formed having a shape foldable at a right angle.

According to the exemplary embodiments of the present disclosure, at least the following effects may be obtained.

Not only the wire passing holes but also the guide holes 114 and 124 are formed in the grommet to increase the friction force applied to the wires, and thus, although the wires are formed to be long, damage to the wires may be prevented by not allowing the wires to be moved upward and inserted into the transmission housing or come into contact with the boundary region between the motor and the transmission.

Also, in the case where the plurality of grommets are installed, both the ends of the fixing hook of the grommet fixing unit are respectively inserted into the guide holes 114 and 124 of the plurality of grommets, and thus, the plurality of grommets may be fixed.

The effects according to the present disclosure are not limited to those exemplified above, and more various effects are included in the present specification.

Those with ordinary skill in the technical field to which the present disclosure pertains will understand that the present disclosure may be carried out in other specific forms without changing the technical idea or essential features. Thus, the above-described exemplary embodiments are to be considered illustrative and not restrictive to all aspects. The scope of the present disclosure is defined by the appended claims rather than the detailed description, and various modifications derived from the meaning and scope of the claims and the equivalent concept thereof should be interpreted as being included in the scope of the present disclosure.

What is claimed is:

1. A grommet comprising:
   a body which has a hexahedral shape with wire passing holes; and
   a guide which extends at right angles from a lower end of the body and has a guide hole therein,
   wherein the wire passing holes are located higher than an upper surface of the guide.

2. The grommet of claim 1, wherein the guide extends in a horizontal direction from the body extending in a vertical direction.

3. The grommet of claim 1, wherein the guide is formed integrally with the body.

4. The grommet of claim 1, wherein each of the wire passing holes is a circular through-hole.

5. The grommet of claim 1, wherein the guide hole has a size greater than a sum of sizes of the wire passing holes.

6. The grommet of claim 1, wherein the guide hole is a rectangular through-hole.

7. The grommet of claim 6, wherein the guide hole has chamfered or filleted corners.

8. The grommet of claim 6, wherein the guide hole is elongated in a width direction of the guide.

9. The grommet of claim 1, further comprising a protrusion which protrudes outward from an outer wall of the body.

10. An apparatus for aligning a wire, the apparatus comprising:
    a plurality of grommets, each comprising a body with wire passing holes, and a guide, which extends from one end of the body at a predetermined angle and has a guide hole formed therein; and
    a grommet fixing unit configured to connect and fix the guides of the plurality of grommets to each other.

11. The apparatus of claim 10, wherein the grommet fixing unit comprises:
    a fixing hook which has a cylindrical annular shape with one side open and whose both ends respectively inserted into the guide holes of the plurality of grommets;
    a wire retainer configured to cover, from above, the wire that simultaneously passes through the wire passing holes and the guide holes; and
    a connection portion configured to connect the fixing hook to the wire retainer.

12. The apparatus of claim 11, wherein the connection portion is bent.

13. The apparatus of claim 12, wherein the fixing hook and the wire retainer are disposed perpendicular to each other.

14. The apparatus of claim 11, wherein the fixing hook has a diameter greater than a sum of thicknesses of outer walls of the plurality of guide holes.

15. The apparatus of claim 10, wherein the guide extends at right angles from a lower end of the body.

* * * * *